C. A. HOOKS.
BEAN HULLER.
APPLICATION FILED AUG. 7, 1912.

1,107,165.

Patented Aug. 11, 1914.
4 SHEETS—SHEET 1.

Witnesses:

Inventor
Charles A. Hooks

C. A. HOOKS.
BEAN HULLER.
APPLICATION FILED AUG. 7, 1912.

1,107,165. Patented Aug. 11, 1914.
4 SHEETS—SHEET 2.

Witnesses

Inventor
Charles A. Hooks
by
Atty.

C. A. HOOKS.
BEAN HULLER.
APPLICATION FILED AUG. 7, 1912.
1,107,165.
Patented Aug. 11, 1914.
4 SHEETS—SHEET 3.
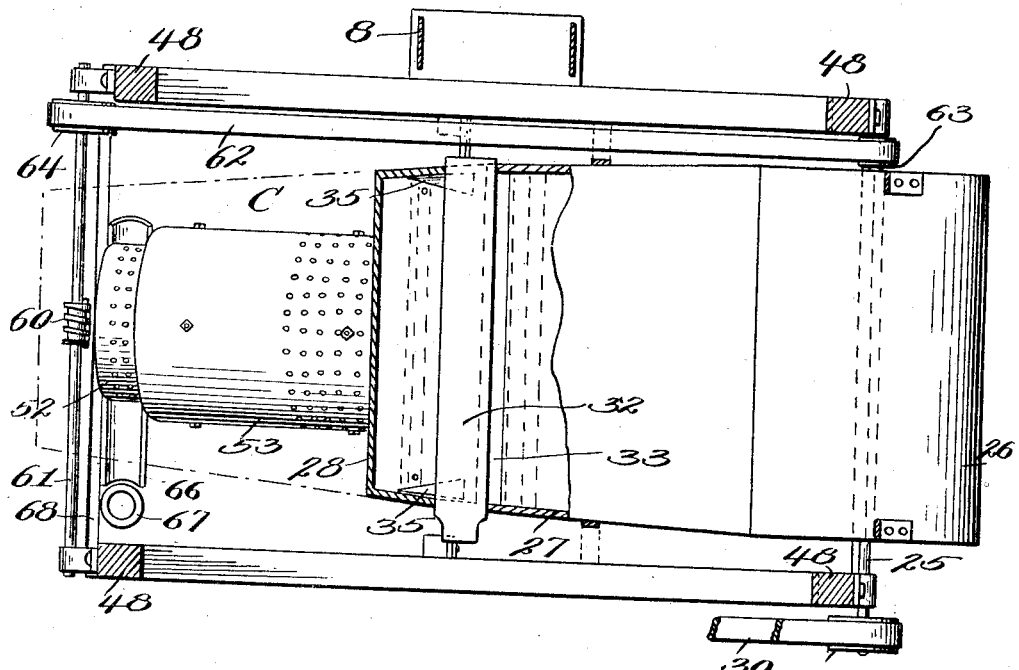
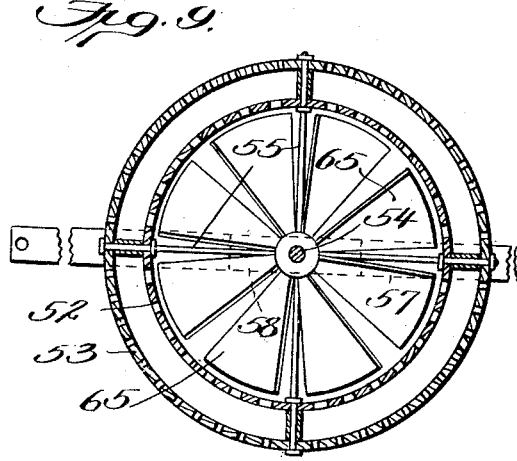
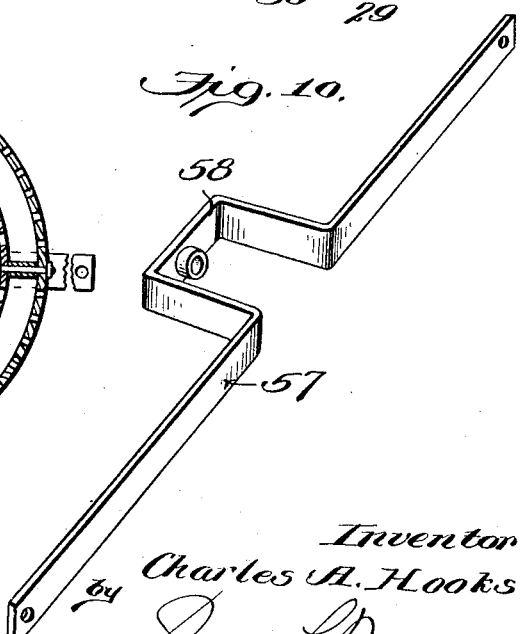
Witnesses:
Inventor
Charles A. Hooks C. A. HOOKS.
BEAN HULLER.
APPLICATION FILED AUG. 7, 1912.
1,107,165.
Patented Aug. 11, 1914.
4 SHEETS—SHEET 4.
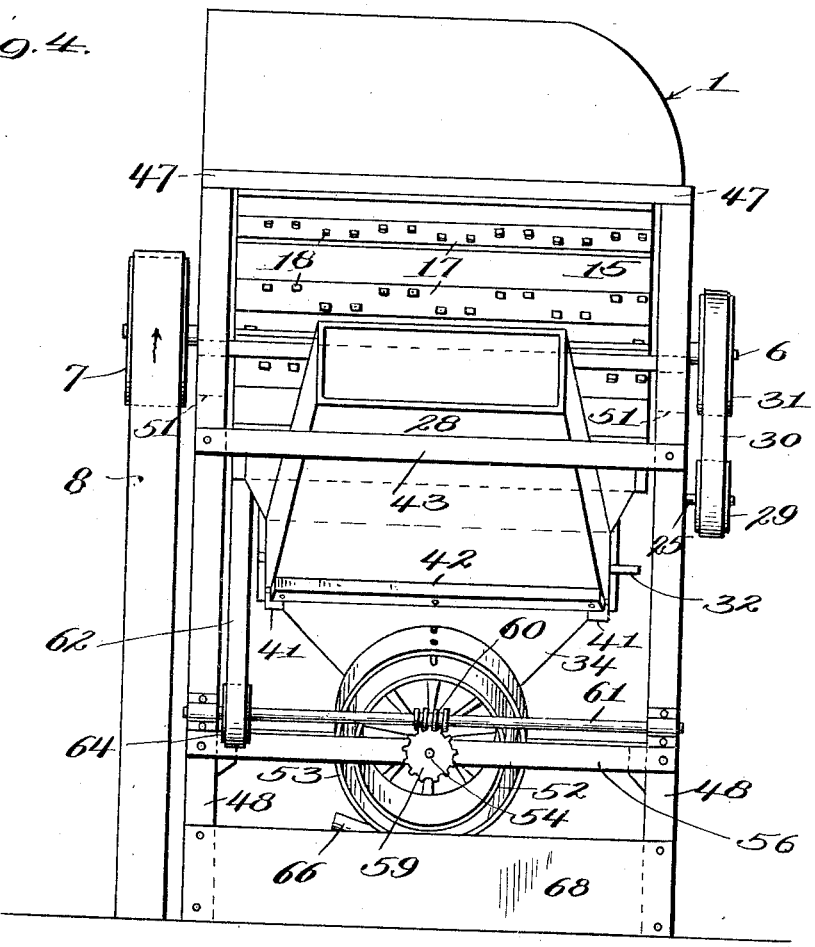
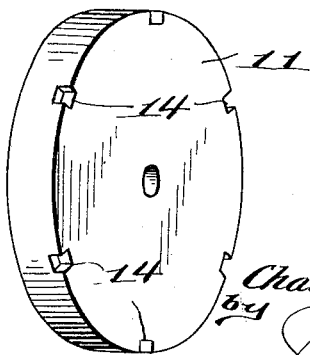
Witnesses:
Norris L. Sumby.
Inventor
Charles A. Hooks
by
Norris L. Sumby,
Atty

UNITED STATES PATENT OFFICE.

CHARLES A. HOOKS, OF OXFORD, FLORIDA.

BEAN-HULLER.

1,107,165.  Specification of Letters Patent.  Patented Aug. 11, 1914.

Application filed August 7, 1912. Serial No. 713,922.

*To all whom it may concern:*

Be it known that I, CHARLES A. HOOKS, a citizen of the United States, residing at Oxford, in the county of Sumter and State of Florida, have invented new and useful Improvements in Bean-Hullers, of which the following is a specification.

The present invention has reference to bean hullers, and more particularly to that type of hulling machine which includes mechanism for breaking the hulls of the beans, a separator and mechanism for removing the broken hulls and cleaning the beans. It comprehends certain hereinafter described improvements in or relating to the three main mechanisms or devices just mentioned and their associated parts which result in the production of an extremely simple and effective machine especially adapted for hulling the so-called "velvet" bean, a species of bean that is indigenous to the extreme Southern States and to southern Florida in particular.

An embodiment of the invention is illustrated in the accompanying drawing, whereof—

Figure 1:
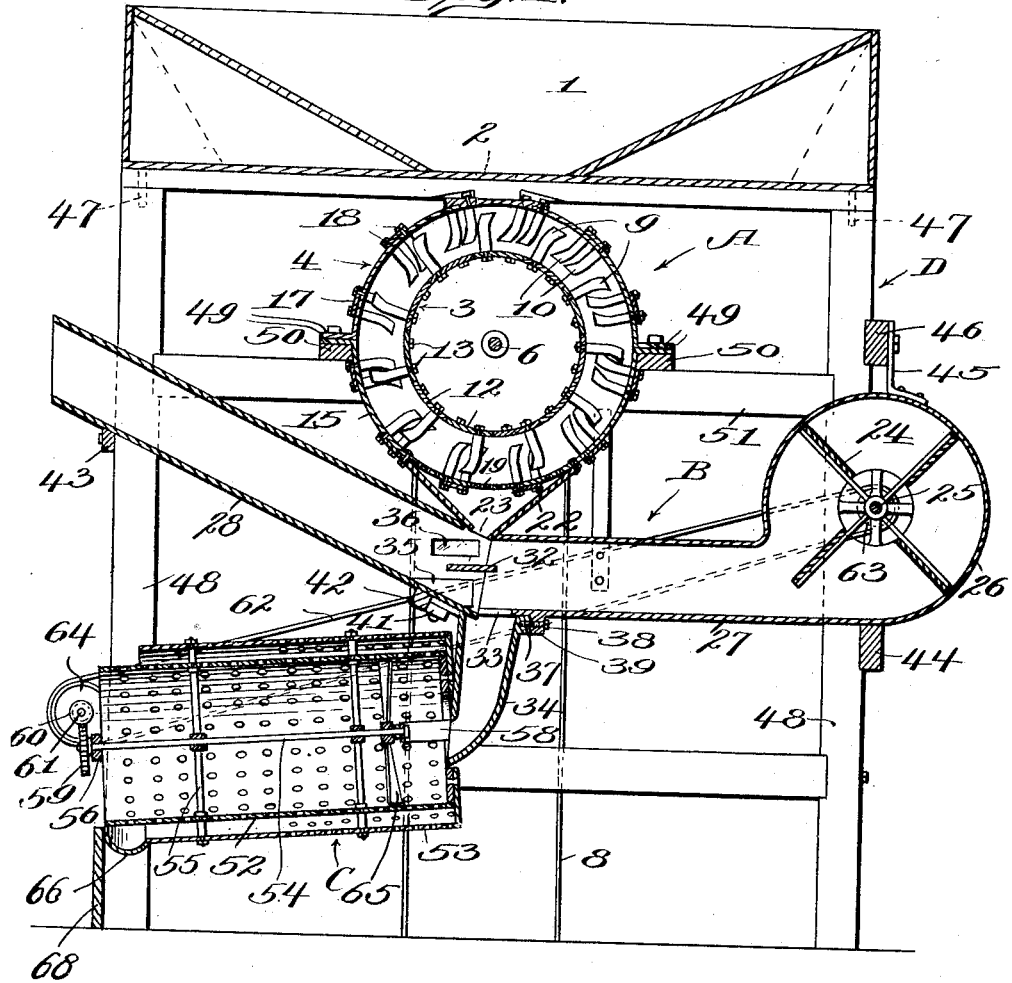
Figure 8:
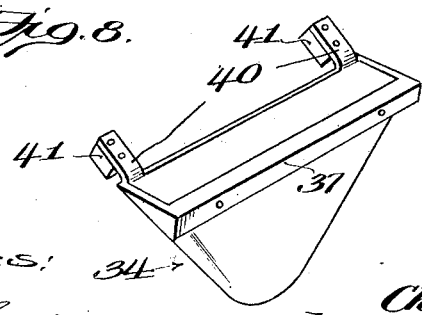
Figure 2:
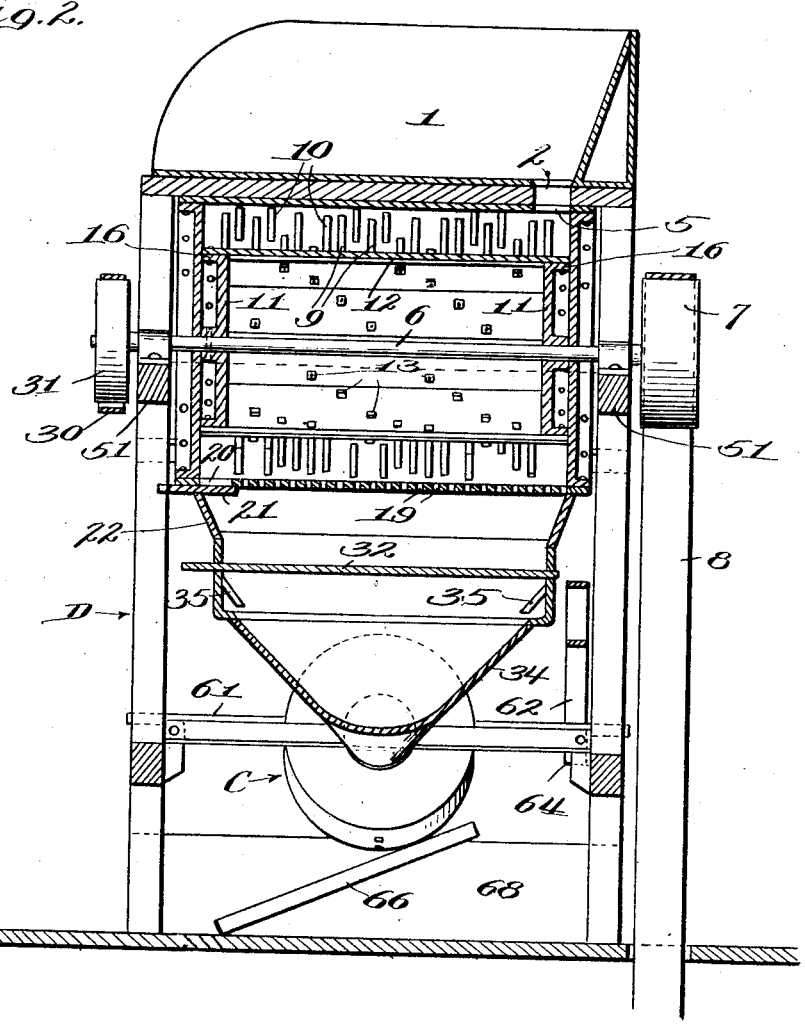
Figure 6:
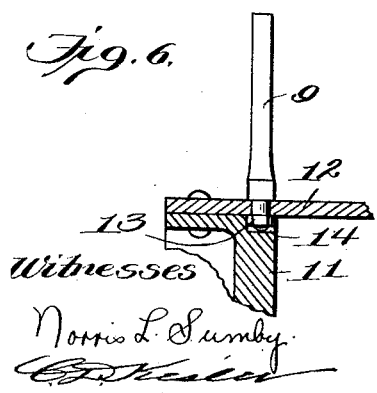
Figure 5:
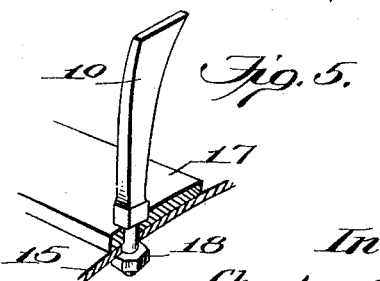

Figure 1 is a vertical sectional view of the improved bean huller; Fig. 2 is a similar sectional view, but taken at right angles to Fig. 1; Fig. 3 is a horizontal section; Fig. 4 is a side elevation of Fig. 1, looking from left to right; Figs. 5 and 6 are enlarged detail views showing the mounting of the teeth utilized in the two component elements of the hull breaking mechanism; Fig. 7 is a detail view of a head of one of said elements; Fig. 8 is a detail view of the chute leading from the separator to the cleaning mechanism; Fig. 9 is an enlarged transverse section of the cleaning mechanism; and Fig. 10 is an enlarged detail view of one of the bearings for supporting the drive shaft included in said mechanism.

The improved huller consists primarily, as has already been stated, of three main mechanisms or devices which serve to break the hulls of the beans, to separate the hulls from the beans and to discharge the chaff and light bits of hull from the machine, and to clean the hulled beans. These mechanisms or devices are indicated in a general manner, respectively, by the reference characters A, B and C, and they are shown as mounted in a frame D of any suitable form, the top part 1 of the frame constituting a hopper into which the beans are initially fed. The floor of this hopper is provided with an outlet opening 2 that leads to the hulling mechanism A.

In the present embodiment of the invention, the aforesaid mechanism A comprises a pair of concentric cylinders 3 and 4, the inner of which is revoluble, while the outer is stationary. The last-mentioned cylinder is supported in any desired manner upon horizontal cross-beams included in the frame and is located directly beneath and in close proximity to the floor of hopper 1. Its upper surface is formed at the rear end thereof with an inlet opening 5 that registers directly with the outlet opening 2 in the hopper floor. The revoluble inner cylinder 3 is rigidly secured to a horizontal shaft 6 suitably journaled in the frame and carrying at its rear end a pulley 7 connected by a belt 8 with any preferred source of power. This shaft constitutes the main drive shaft of the machine and is connected with the various other mechanisms and instrumentalities, as hereinafter described.

The cylinders 3 and 4 are provided with coöperative series of teeth 9 and 10 that are slightly offset toward each other. The revoluble cylinder 3 is, by preference, made up of a pair of flanged heads 11 connected by longitudinal slats or staves 12, to which the teeth 9 are fixed, the reduced shanks of the teeth being held in place by nuts 13 that are tightened against the inner faces of the slats. The nuts carried by the teeth at the ends of the slats are received in seats 14 that are formed in the cylinder heads 11, as depicted in Figs. 6 and 7, whereby they are prevented from turning. The stationary cylinder 4 preferably consists of a metal shell 15 connected at its front and rear edges to flanged heads 16 and having arranged against its outer surface a series of slats 17 to which the teeth 10 are attached, the shanks of the teeth passing through registering openings in the shell and slats and being equipped with fastening nuts 18. As shown in Fig. 1, the slats 12 which form the inner cylinder are arranged with their side edges in mutual contact, whereas the slats 17 are spaced at suitable intervals apart. The portion of shell 15 between the two lowermost or bottom slats 17 is perforated, as indicated by the numeral 19, and this portion may, therefore, be considered as constituting, in effect, a concave, and will be so termed hereinafter. The teeth carried by the slats 12 and 17 are arranged in staggered relation, so as to coöperate with each other in breaking the hulls of the beans and in feeding the broken hulls and the beans toward the front end of the chamber or space between the cylinders. During their travel along the bottom of the outer or fixed cylinder, the beans fall through the perforations 19, while the hulls eventually reach and fall through an opening 20 at the front end of said cylinder. This opening may, however, be closed, if desired, by means of a sliding door 21 (see Fig. 2), said door being moved manually into its closed position when the beans are introduced in a comparatively wet state into the hulling machine, in which condition their hulls require much more time to be broken and removed than when dry. In consequence, the closing of the aforesaid opening will retain the beans within the above-mentioned space or chamber and will insure their being repeatedly acted upon by the two sets of teeth until completely hulled.

The beans and hulls, on leaving the hulling mechanism, fall into a longitudinally disposed funnel-like chute 22, that is disposed directly beneath the fixed cylinder 4 and extends from end to end thereof, as shown in Figs. 1 and 2. Through said chute they pass, in turn, to the separator B by way of an opening 23. This separator consists of a fan 24 mounted upon a horizontal shaft 25 and disposed within a case 26 suitably supported in frame D, the fan shown being of the blast type. The discharge neck of the case preferably consists of a horizontal section 27 which is connected directly to said case, and an upwardly-inclined outlet section 28, the above-mentioned opening 23 being located at the junction between the two sections. To operate the fan, its shaft 25 is provided upon its front end with a pulley 29 which is driven by a belt 30 from a pulley 31 mounted upon the corresponding end of the cylinder shaft 6.

On passing through opening 23, the beans and hulls fall upon and are momentarily arrested by a horizontally-disposed board 32 that is slidably supported in alining openings in the neck walls and serves to prevent the beans from striking the lower inclined wall of section 28 and being deflected thereby into the horizontal section 27. The air directed by the fan against the falling beans and hulls, then forces the chaff and small light pieces of hull through the discharge section and out of the machine, the beans themselves and the large heavy pieces of hull falling through an outlet opening 33, located beneath board 32, into a chute 34 and thence into the cleaning mechanism C. The discharge section 28 of the separator neck preferably has a gradually-decreasing width from its lower to its upper end, to slightly condense or compress the air current and its lower end may also be contracted, for a similar purpose, if desired, by the employment of angularly-arranged strips or blocks 35, or the like, as shown in Figs. 1, 2 and 3. To observe the passage of the beans and hulls through the separator neck, and the action of the air upon the same, either or both of the side walls of the neck may be provided, at the junction of the neck sections with sight openings in which panels 36 of glass or other transparent material are placed.

Chute 34 has, by preference, a direct detachable connection with section 27 of the separator neck, to which end one of its upper longitudinal edges is provided with an enlarged flange 37, (see Fig. 8), that is secured by removable fasteners 38 to a transverse rib 39 formed upon the lower wall of said section. Its opposite edge is furnished with a pair of lateral straps 40 having terminal stop blocks or lugs 41 that are engaged by a transverse bar 42 secured to the lower wall of section 28, said blocks constituting, therefore, the lower support for section 28, the upper portion of that section resting upon a cross-beam 43 of the frame. In like manner, the fan casing 26 may rest upon a cross-beam 44 at the opposite side of the frame and may have a detachable bracket connection 45 with a second cross-beam 46 arranged above beam 44.

Removable mountings may be also provided for the hopper 1 and the hulling mechanism A, the first of these parts being furnished at its corners with depending pins 47 that fit in sockets in the upper ends of the vertical frame posts 48. The shell 15 of the other part is preferably constructed of semicylindrical sections having mating lateral flanges 49 at their side edges, these flanges resting on and being removably fastened to a pair of horizontal beams 50 which are supported, in turn, by the front and rear upper cross-beams 51.

The lower end of chute 34 opens into the mechanism C, which latter, in the construction illustrated, is in the form of a screen consisting of a pair of inclined concentric cylinders 52 and 53. Both cylinders are preferably constructed of perforated sheet metal, the openings in the inner cylinder 52 extending from end to end thereof and being large enough to permit the beans to fall therethrough onto the bottom of the outer cylinder 53, while those in the said outer cylinder are approximately half the size of the first mentioned openings and occupy only the rear half of that cylinder. The inner cylinder is mounted upon an inclined shaft 54, to which it is connected by suitable spiders 55, or the like, the spider arms being extended through openings in said cylinder and fastened to the outer cylinder, so as to cause both cylinders to revolve in unison. Shaft 54 is journaled at its opposite ends in bearing members 56 and 57 connected with the frame, the upper bearing 57 being in the form of a strap having a central U-shaped extension 58 which projects through the open upper ends of the screen cylinders 52 and 53 into the interior of the inner cylinder. To rotate this shaft and, in consequence, the screen, its forward end is provided with a worm wheel 59 that meshes with and is driven by a worm 60 fast upon a horizontal countershaft 61 journaled at its ends in bearings fastened to the front posts 48; shaft 61, in turn, is driven from the fan shaft 25 by means of belt 62, which latter connects the pulleys 63 and 64 secured, respectively, to shafts 25 and 61.

As above stated, the two cylinders 52 and 53 which comprise the screen, are inclined downwardly, the purpose being to provide for a gravity feed of the materials introduced into the inner cylinder. To prevent too rapid a feed, the said inner cylinder may be equipped with a spider 65 whose blades or arms are set at an angle, like the blades of a rotary fan. The outer cylinder, as shown, terminates an appreciable distance short of the lower end of the inner cylinder and has associated with it a chute 66 which leads to an opening 67 in the floor of the room wherein the machine is located. This chute is overhung by the lower end of the inner cylinder, and has disposed at one side thereof a board or partition 68 that serves to prevent the material discharged through the open end of the inner cylinder from falling into the chute.

So far as the operation of the cleaning mechanism is concerned, it may be stated that the beans and heavy pieces of hull, which fall into chute 34 through the opening 33 in the blower neck, will, on passing through said chute, enter the open upper end of the inner screen cylinder 52. As the screen revolves at a very slow speed, owing to the inclusion of the worm gearing in its driving mechanism, the material will gradually move by gravity toward the lower end of the cylinder, its movement being initially arrested by the spider 65. During this movement, the beans will fall through the perforations in the inner cylinder onto the bottom of the outer cylinder and will then travel toward the open lower end of the latter cylinder, eventually passing therethrough into the chute 66, whence they are delivered through opening 67 into a suitable collecting receptacle, (not shown). Owing to the rotation of the screen, as well as to the employment of the spider 65, the beans will be somewhat shaken up during their travel, this shaking serving to dislodge any small particles of hull which may still cling thereto; such particles, together with any other small particles of hull, chaff, dirt or dust and especially faulty beans that may also pass with the beans through the perforations in the inner cylinder, will fall through the perforations in the outer cylinder, thus insuring the beans reaching the chute 66 in a perfectly clean state. The large heavy pieces of hull, which cannot pass through the openings in the inner cylinder, are eventually discharged through the open end of the latter, but are prevented from falling into chute 66 by the board 68.

The operation of the entire machine is believed to be apparent from the foregoing, and, hence, to require no extended or separable explanation. It will be observed, however, that the removable mounting of the various parts enables any part to be readily replaced by a new one, when injured or worn, without requiring dismantling of the machine.

Having fully described my invention, I claim:

1. In a hulling machine, the combination of a separator having a neck which consists of a pair of separable sections arranged in longitudinal alinement and provided at their junction with inlet and outlet openings for the material undergoing treatment, each section having a transversely-arranged member provided upon its bottom wall; and a discharge chute located directly beneath said outlet opening and having its upper edges detachably connected with said members.

2. In a hulling machine, the combination of a separator having a neck which is formed intermediate the ends thereof with inlet and outlet openings for the material undergoing treatment and is provided on its bottom wall at one side of the outlet opening with a transverse rib and at the other side with a transverse bar; and a discharge chute located directly beneath said outlet opening and having one of its upper longitudinal edges provided with a flange detachably fastened to said rib, and its other upper longitudinal edge provided with lateral lugs detachably engaged with said bar.

3. In a hulling machine, the combination of a separator having a neck which consists of a pair of separable sections arranged in longitudinal alinement and provided at their junction with inlet and outlet openings for the material undergoing treatment, one section being provided upon its bottom wall at one side of the outlet opening with a transverse rib, and the other section being provided upon its bottom wall with a transverse bar; and a discharge chute located directly beneath said outlet opening and having one of its upper longitudinal edges provided with a flange detachably fastened to said rib, and its other upper longitudinal edge provided with lateral lugs detachably engaged with said bar.

In testimony whereof I have hereunto set my hand in presence of two subscribing witnesses.

CHARLES A. HOOKS.

Witnesses:
J. C. STUPP,
T. E. ODELL.

Copies of this patent may be obtained for five cents each, by addressing the "Commissioner of Patents, Washington, D. C."